United States Patent Office 3,500,573
Patented Mar. 17, 1970

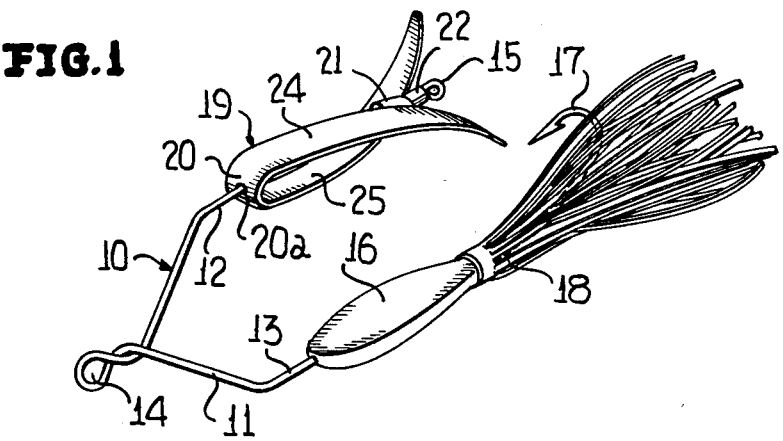
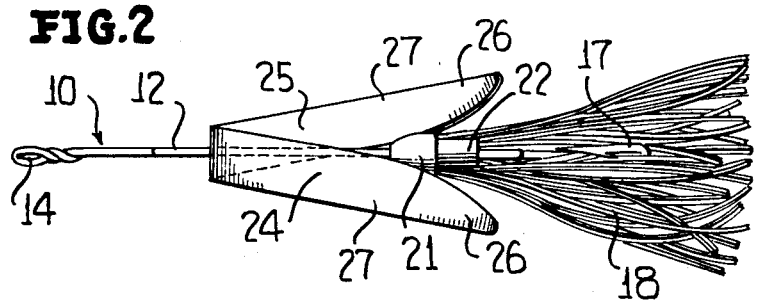
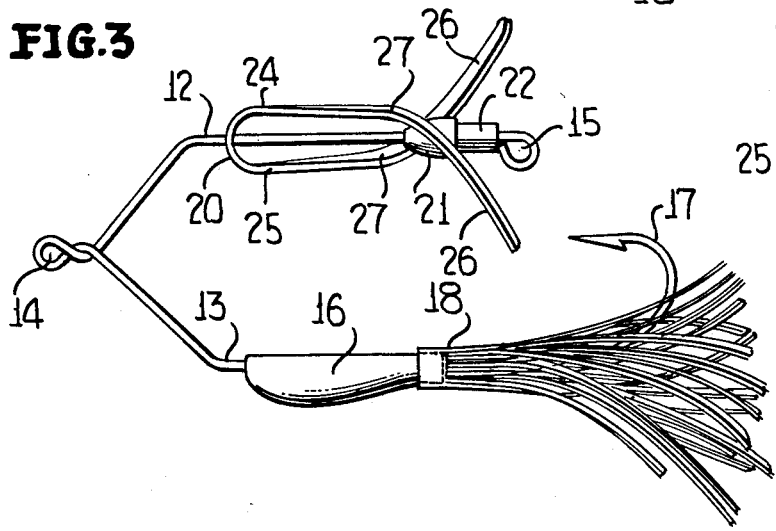
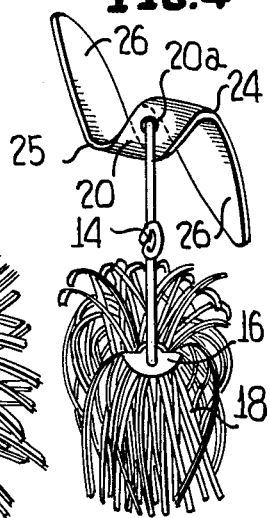

3,500,573
FISHING LURE
John R. Hudson, Greenville, Ky.
(2904 Alabama St., Paducah, Ky. 42001)
Filed Dec. 4, 1967, Ser. No. 687,685
Int. Cl. A01k 85/00
U.S. Cl. 43—42.11     7 Claims

ABSTRACT OF THE DISCLOSURE

An underwater fishing lure comprising a weighted hook and a spinner which is mounted on a shaft a distance laterally of and substantially parallel to said hook. The spinner has blades which cause water to exert pressure on both sides of the axis of rotation. Each blade includes an arcuate portion including the whole width of the blade and which extends from a first side of the shaft portion to the rearward end section of the blade on a side of the shaft opposite from the first side. The lure construction prevents snagging of the hook as the lure is pulled through the water. In addition, the moving parts serve to attract fish as the lure travels through the water.

BACKGROUND OF THE INVENTION

The underwater lure of this invention includes a structure which has a spinner spaced laterally and in front of a weighted hook. The broad concept of such a structure, as stated, is old and well known, as exemplified by Patents 2,261,433 and 3,093,923. The fishing lure of the first mentioned patent is an underwater lure which necessitates the use of live bait or other artificial bait being placed upon the hook to weight it down. The spinner of the disclosed underwater lure is used merely as an attention attracting means and in no way serves a function of snag-proofing the hook as the lure is pulled through the water. The fishing lure of Patent 3,093,923 is a surface-type lure which shows the general construction of the lure to include a spinner on one shaft portion and a hook on a second shaft portion. Here again, the spinner is merely being used to attract the fish to the lure. It is in no way constructed or positioned to benefit the snagging problems encountered while fishing with such a lure below the surface of the water.

SUMMARY OF THE INVENTION

It is an object of this invention to present a simple, practical and easy to use fishing lure that will effectively attract fish during casting and trolling.

It is another object of this invention to provide a fishing lure that is almost completely snag-free, thereby overcoming the problem of entanglement in weeds and on rocks while pulling the fishing lure through and under the surface of the water.

The fishing lure of this invention also makes use of a novel spinner which is effectively placed to function as a snag-proofing apparatus with respect to the hook that is included in the lure. This novel spinner is constructed to allow the water to exert pressure on both sides of the line of axis of rotation of the spinner, thereby causing the spinner to rotate as the lure is drawn through the water.

The above and other objects and features of this invention will appear more fully hereinafter from consideration of the following description taken in connection with the accompanying drawings wherein one embodiment of the invention is illustrated by way of an example.

DESCRIPTION OF THE DRAWINGS

The specific embodiment of the disclosed invention is shown in the accompanying drawings, in which:

FIGURE 1 shows a perspective view of a fishing lure constructed in accordance with this invention;
FIGURE 2 is a top view of the same fishing lure;
FIGURE 3 is a side elevation of the same; and
FIGURE 4 is a front elevation of the lure.

DESCRIPTION OF A SPECIFIC EMBODIMENT

Referring more specifically to FIGS. 1 through 4, the fishing lure designated generally as 10 is constructed of a single continuous wire 11 having a front end and rear end and including two parallel shaft portions 12 and 13. An eyelet 14 on the front end is used for attaching a fishing line (not shown) which will drag the lure under water. Another eyelet 15 located at the rear end of shaft portion 12 keeps the spinner 19 in place. A weighted bait body 16 is mounted on shaft 13. Attached to the weighted bait body 16 is the hook 17 which is upwardly or inwardly mounted so as to have its point placed within the area between the two parallel shaft portions 12 and 13 of the continuous support wire 11.

A skirt or tail piece 18 is placed on the weighted bait body 16 at about the point where the hook 17 is attached to the said bait body 16. The skirt or tail piece 18 includes a plurality of flexible strands (unnumbered) of plastic, string, foil, feathers, or similar substances which function to attract fish because of the movement thereof as the lure 10 is retrieved. The skirt 18 also functions as a screen for the hook so that the hook is hidden from the view of the fish.

A spinner 19 is placed on the parallel shaft portion 12. The spinner 19 is constructed from a single piece of metallic material and includes a front portion 20 which has a hole 20a through which the shaft 12 runs. The spinner 19 could also be constructed of other suitable material such as plastic. The spinner 19 includes elongated blade portions 24 and 25 which are attached to a journal body 21 mounted for rotation upon shaft 12. An additional journal 22 is backwardly placed of journal body 21 for the purpose of permitting low friction rotation of the spinner 19. The journals 21 and 22 may be made of either plastic or light metal, or any other material which will permit a low friction rotation of the members.

The blade portions 24 and 25 are identical on the spinner 19 and include major and minor portions 26 and 27, respectively. The major portions 26 of blades 24 and 25 includes that surface area which absorbs a great amount of water pressure on one side of the axis of rotation as the lure is being drawn through the water. The minor portions 27 are located on the other side of the axis of rotation from major portions 26 on blade portions 24 and 25 and are also affected by water pressure as the lure is pulled through the water. This spinner 19 differs from prior art spinners having blade portions on which the water pressure is exerted on only one side of the axis of rotation of the spinners.

The minor portions 27 converge toward each other while the major portions 26 diverge away from each other. This consequently has a crossing effect with regard to blade portions 24 and 25. Blade portions 24 and 25 are substantially parallel to each other, as seen in FIG. 4. Blade portions 24 and 25 are also inclined relative to a plane normal to the axis of the spinner 19, as seen in FIG. 3.

In operation, the fishing lure 10 is attached to a conventional fishing line or leader (not shown) by means of eyelet 14. After the bait has been cast, it is retrieved by a steady or jerking pull upon the fishing line. The resistance of the water on blades 24 and 25 causes the rotation thereof in either continuous or intermittent fashion. The positioning of the spinner blades 24 and 25 just ahead of the point of the hook 17 keeps the water around the hook 17 activated in such a fashion as to keep the hook free from any weeds or other obstructions that might be encountered while the fishing lure 10 is being retrieved through the water. The spinner 19 could actually be positioned close enough to the hook for actual contact to occur between the hook 17 and the blades 24 and 25. The resultant knocking action would thereby be aiding in snag-proofing the lure of the invention. As can be seen, therefore, the important aspect of the spinner 19 is not only to attract the attention of fish but also to act as a snagging preventative with respect to the hook 17. It is obvious to a man having ordinary skill in the art that the distance between the spinner 19 and the hook 17 varies as a function of the size of the various members involved. The specific distance must not be greater than the effectiveness of the spinner 19 in its action to keep the hook 17 free from entanglement.

In further description of the operation of this fishing lure, the skirt 18, which is flexible, will persistently move and look as if there is life present and attract fish to the hook region of the bait. It is obvious that the various portions of this fishing lure may be painted in any desired way which is known to the prior art. The reflection of light on any painted portions serves to attract fish by creating life-like movement to the fishing lure.

While the fishing lure has been shown and described in detail, it is obvious that this invention is not to be considered as being limited to the exact form disclosed, and that changes in detail and construction may be made therein within the scope of the invention, without departing from the spirit thereof.

I claim:

1. In a lure used for fishing having at least one shaft portion, a spinner assembly comprising:
   (a) means rotatably mounting a spinner member on said shaft portion,
   (b) said spinner member including a front end portion and a pair of blade portions,
   (c) said front end portion having a substantially U-shaped longitudinal cross-section comprising a curved surface portion and two substantially flat leg portions extending rearwardly from the curved surface portion,
   (d) said front end portion being rotatable about a point located on said curved surface portion,
   (e) each said blade portion extending rearwardly from a respective leg portion and terminating at its rear end in a rear end section having a substantially flat surface,
   (f) each said blade portion including an arcuate portion including the whole width of said blade portion and extending from a first side of the shaft portion to said rear end section on a side of the shaft portion opposite from said first side to cause water pressure to be exerted on each blade portion at locations thereon disposed on each side of said shaft portion when the spinner assembly is pulled through the water,
   (g) each said blade portion having a pair of outer edges which extend in divergent directions with respect to each other from edges on said front end portion to said rear end.

2. In a lure as defined in claim 1, a spinner assembly wherein:
   each said arcuate portion constitutes a minor portion having substantially flat surfaces converging with respect to and located on opposite sides of said shaft portion and each said rear end section constitutes a major portion having substantially flat surfaces diverging with respect to and located on opposite sides of the shaft portion.

3. In a lure as defined in claim 1 wherein:
   said spinner member comprises a single, continuous substantially flat strip of material forming a folded construction including said front end portion and said pair of blade portions.

4. In a lure as defined in claim 3 wherein:
   said rotatable mounting means includes a journal body located between and fixedly attached to each said blade portion.

5. In a lure as defined in claim 1 wherein:
   said lure has two shaft portions which are substantially parallel to each other,
   said spinner member being located on one of said shaft portions and a weighted hook being fixedly mounted on the other said shaft portion,
   said spinner member being located in front of said hook by an amount effective to prevent the hook from snagging when the lure is pulled through water.

6. In a lure as defined in claim 5 wherein:
   a weighted body is mounted on said other shaft portion with said hook.

7. In a lure as defined in claim 6 wherein:
   a skirt portion is mounted on said other shaft portion with said weighted body to disguise said hook.

References Cited

UNITED STATES PATENTS

| | | | |
|---|---|---|---|
| 871,057 | 11/1907 | Davis | 43—42.13 |
| 2,086,008 | 7/1937 | Turner | 43—42.2 |
| 2,167,945 | 8/1939 | Gilliam | 43—42.13 |
| 2,261,433 | 11/1941 | Demory | 43—42.13 X |
| 2,518,031 | 8/1950 | Lane | 43—42.2 |
| 3,093,923 | 6/1963 | Jackson | 43—42.11 |
| 3,143,824 | 8/1964 | Thomas | 43—42.11 |

ALDRICH F. MEDBERY, Primary Examiner

J. H. CZERWONKY, Assistant Examiner

U.S. Cl. X.R.

43—42.2, 42.4, 42.28